United States Patent [19]
King

[11] Patent Number: 6,166,630
[45] Date of Patent: Dec. 26, 2000

[54] WIRELESS FUEL GAUGE

[75] Inventor: Joseph D. King, Ann Arbor, Mich.

[73] Assignee: Lear Automotive Dearborn, Inc., Southfield, Mich.

[21] Appl. No.: 09/099,085

[22] Filed: Jun. 17, 1998

[51] Int. Cl.[7] .................................................. B60Q 1/00
[52] U.S. Cl. .................... 340/450.2; 340/621; 250/577
[58] Field of Search ........................ 340/450.27, 450.3, 340/450.1, 450, 618, 619, 621, 539; 356/358; 250/577; 73/290

[56] References Cited

U.S. PATENT DOCUMENTS

| | | | |
|---|---|---|---|
| 3,683,196 | 8/1972 | Obenhaus | 250/577 |
| 3,910,116 | 10/1975 | Smith | 73/290 V |
| 4,840,056 | 6/1989 | Fernandez et al. | 702/100 |
| 4,912,646 | 3/1990 | Cerruti | 364/509 |
| 4,926,331 | 5/1990 | Windle et al. | 364/424.04 |
| 4,961,069 | 10/1990 | Tsaprazis | 250/577 |
| 5,194,747 | 3/1993 | Culpepper et al. | 340/619 |
| 5,257,090 | 10/1993 | Meinzer et al. | 356/358 |
| 5,519,397 | 5/1996 | Chapotot et al. | 341/155 |
| 5,648,844 | 7/1997 | Clark | 356/5.09 |
| 5,703,464 | 12/1997 | Karunasiri et al. | 320/19 |
| 5,708,424 | 1/1998 | Orlando et al. | 340/870.08 |
| 5,717,376 | 2/1998 | Wilson | 340/442 |
| 5,814,830 | 9/1998 | Crowne | 250/577 |
| 5,880,480 | 3/1999 | Ellinger et al. | 250/577 |

FOREIGN PATENT DOCUMENTS

| | | |
|---|---|---|
| 0 178 607 A2 | 6/1996 | European Pat. Off. . |
| 36 39 455 A1 | 5/1988 | Germany . |
| 56-038045 | 10/1981 | Japan .................. 340/450.2 |

*Primary Examiner*—Daniel J. Wu
*Attorney, Agent, or Firm*—Niro, Scavone, Haller & Niro

[57] ABSTRACT

A wireless fuel gauge assembly including a fuel tank containing fuel having a level defining a liquid-air boundary. A control determines a digital indication of the fuel level. The control is able to determine plural digital signals that provide incremental level readings. A transmitter then sends an RF signal indicative of the level. A receiver captures the RF signal and communicates to a fuel gauge.

22 Claims, 4 Drawing Sheets

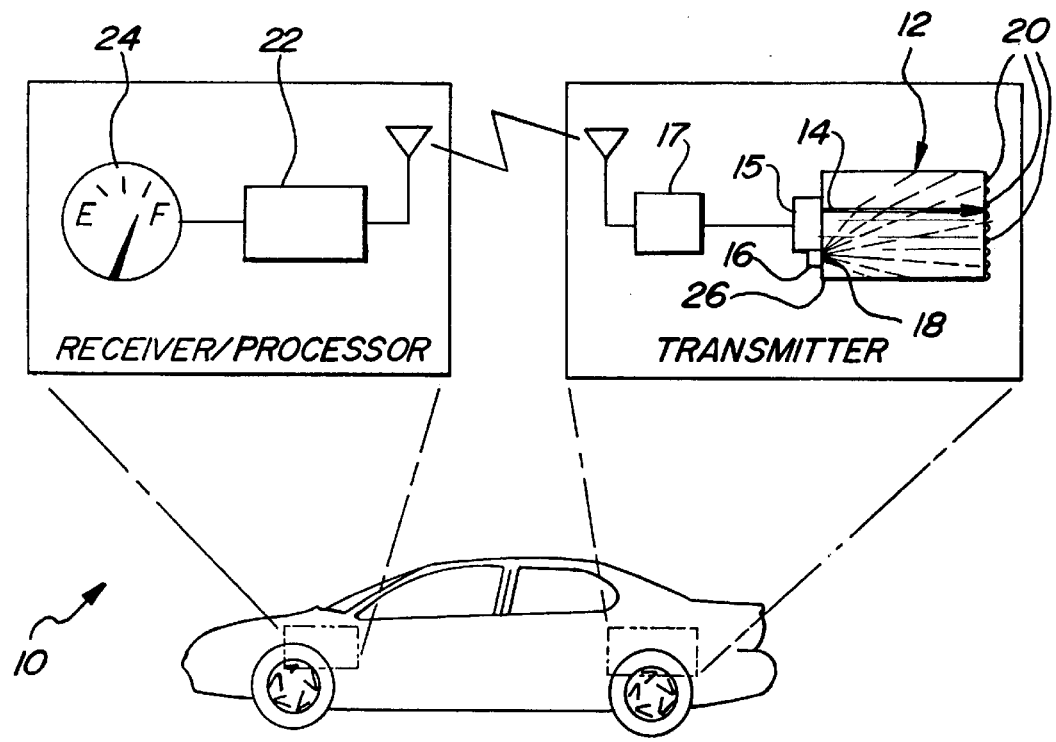
Fig-1
Fig-4
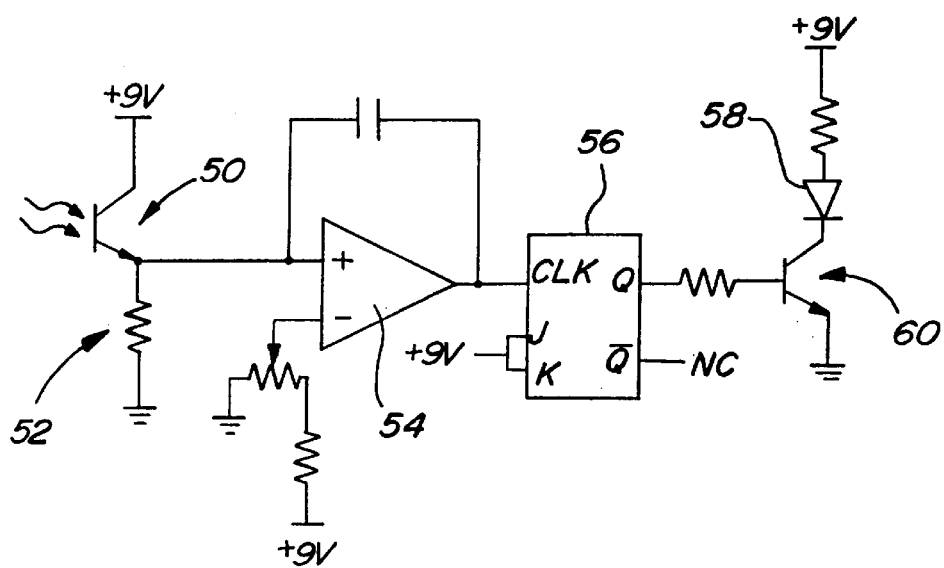

WIRELESS FUEL GAUGE

BACKGROUND OF THE INVENTION

The present invention relates to a wireless fuel gauge. Preferable the fuel gauge provides incremental reading levels.

Vehicles include measuring assemblies to measure the amount of liquid in a container such as the fuel tank. Traditionally, floats or other direct measuring devices have been used. More recently, measuring assemblies which provide an accurate determination of the liquid level within a vessel such as a vehicle fuel tank while remaining external to the vessel have been proposed. To obtain the desired accuracy it has been proposed to transmit optical waves into a vessel to effect the non-intrusive measuring of a liquid contained therein.

One such method derives distance from the speed of light by transmitting an amplitude-modulated light beam at the liquid boundary and comparing the phase of a return signal with the phase of the transmitted signal. The relative phase of the two signals depend on the modulation frequency of the signal and the distance to the liquid boundary.

These prior systems have utilized a direct link from the fuel gauge to a control or display at the instrument panel. Thus, wiring and connectors are required. Moreover, these systems could be generally described as supplying analog level information.

SUMMARY OF THE INVENTION

The present invention provides a wireless fuel gauge wherein the liquid level within a fuel tank is determined and sent to a control over a wireless link. Preferably, the sensor develops a series of incremental level readings. This type of level sensor is particularly well suited to the use of a wireless fuel gauge in that the level information is digital, and thus easy to transmit.

One preferred liquid measuring assembly includes a vessel for containing a liquid having a level defined by a liquid-air boundary. A transmitter emits an optical signal into the vessel, and a receiver detects a portion of the optical signal which reflects from the liquid-air boundary. The reflected optical signal is then compared to expected aspects of the optical signal to determine the level of the liquid.

Preferably, the transmitter is mounted near the bottom of the vessel to emit the optical signal into the liquid and generally parallel to the liquid-air boundary. The receiver is preferably a photodetector mounted at a location to detect the portion of the optical signal which reflects parallel from the liquid-air boundary. Preferably, the vessel has a wall with a course outer surface and a smooth inner surface which disperses the optical signal throughout the vessel. Applicant recognizes that the light intensity will be maximum at the liquid level.

The system is thus able to provide incremental information about the level. By utilizing a plurality of sensors a control can compare the signals to identify the one with the highest intensity. The control can then associate the full level with the highest intensity reading sensor. The accuracy of the present invention may be refined by increasing the number of receivers in a vertical array.

The digital information is better adapted to be transmitted over a wireless link.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a general perspective view of the wireless fuel gauge of the present invention;

FIG. 4 is a schematic diagram of a circuit of the present invention which generated the plot of FIG. 3.

DETAILED DESCRIPTION OF THE PREFERRED EMBODIMENT

Figure 2:
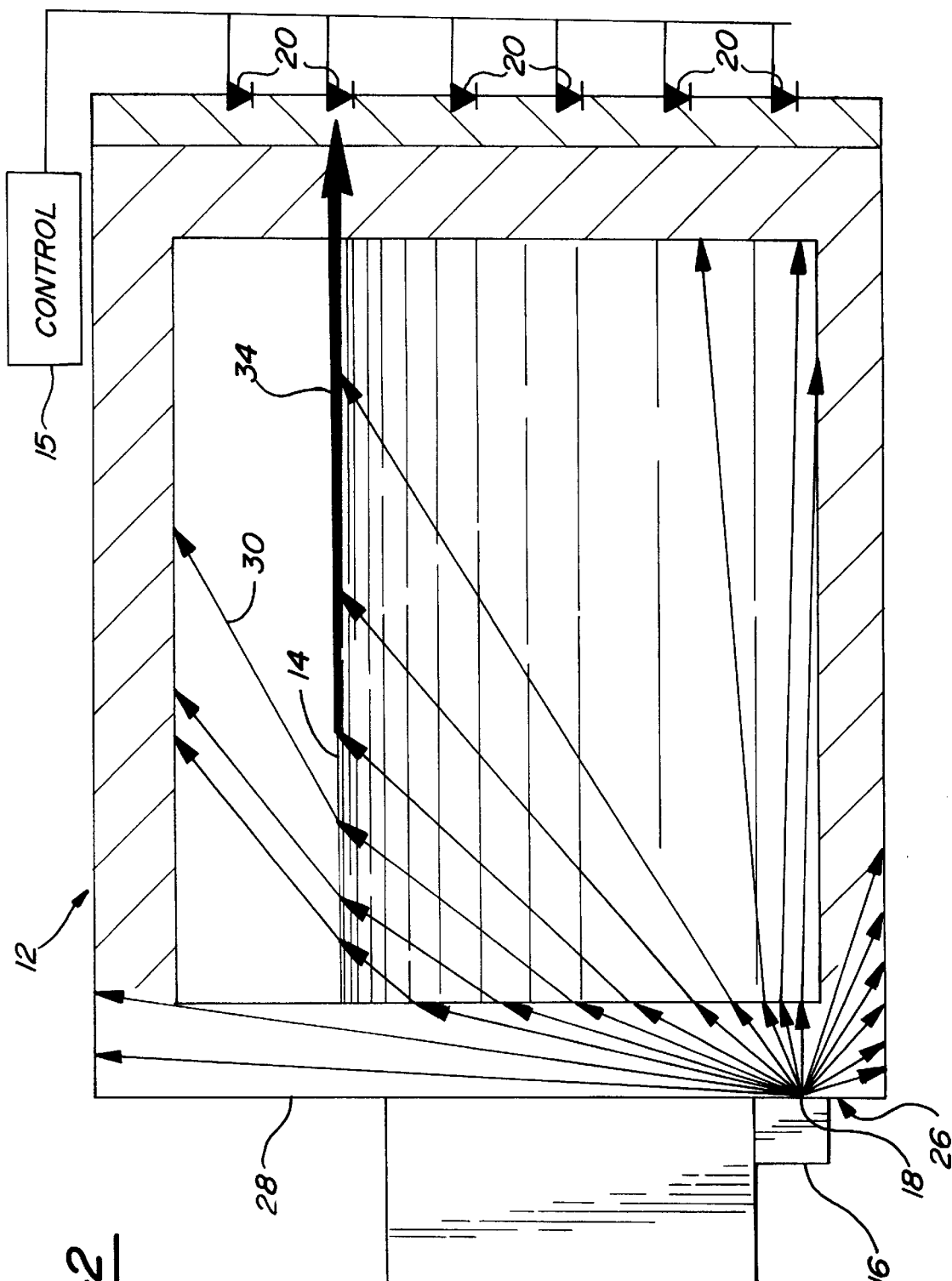
FIG. 2 is a cross-sectional view of the fuel tank of FIG. 1 showing a representative optical signal emitted therein.

A wireless fuel gauge assembly 10 is generally shown in FIG. 1. Assembly 10 includes a fuel tank 12 for containing fuel having a level defined by a liquid-air boundary 14. A control 15 determines a digital signal indicative of the level, as will be described below. Control 15 communicates to a RF transmitter 17. Transmitter 17 sends a RF signal.

The present invention uses a known liquid measurement technique that provides digital indications of fuel level. This technique is not known for use in a wireless fuel gauge. In the level measuring technique, transmitter 16 emits an optical signal 18 into the vessel 12, and a receiver 20 detects a portion of the optical signal 18 reflecting from the liquid-air boundary 14. Optical signal 18 is compared to expected aspects to determine the level of the liquid. The RF signal from transmitter 17 is captured by a wireless receiver 22. Signals captured by receiver 22 is communicated to a fuel gauge 24. The gauge 24 is located in the instrument panel, with the wireless link communicating the liquid level to the gauge 24. Known RF techniques may be used to provide wireless link. The use of the wireless link eliminates the need for separate wiring.

Fuel tank 12 may be constructed of any material so long as at least one windowed aperture 26 is provided that is substantially transparent to the transmission and reception of the optical signal 18. However, tank 12 is preferably constructed entirely of high density polyethylene, polypropylene, or other plastic material that provides the aforementioned transparency quality throughout the entire wall. A further preferable characteristic of the tank is that it provides a wall 28 having a coarse outer surface texture with respect to the diameter of the optical signal 18.

FIG. 2 shows transmitter 16 which is preferably at least one laser diode mounted to emit a collimated optical signal 18 into the liquid and generally parallel to the liquid-air boundary 14. The laser diode may be operated to emit the optical signal 18 in a pulsing manner or may be continuously operated. The transmitter 16 may be mounted near the tank bottom 32 to maximize the volume of measurable liquid. The volume of liquid measurable by a laser diode does of course correspond to the liquid measured and the power of the laser diode.

Figure 2A:
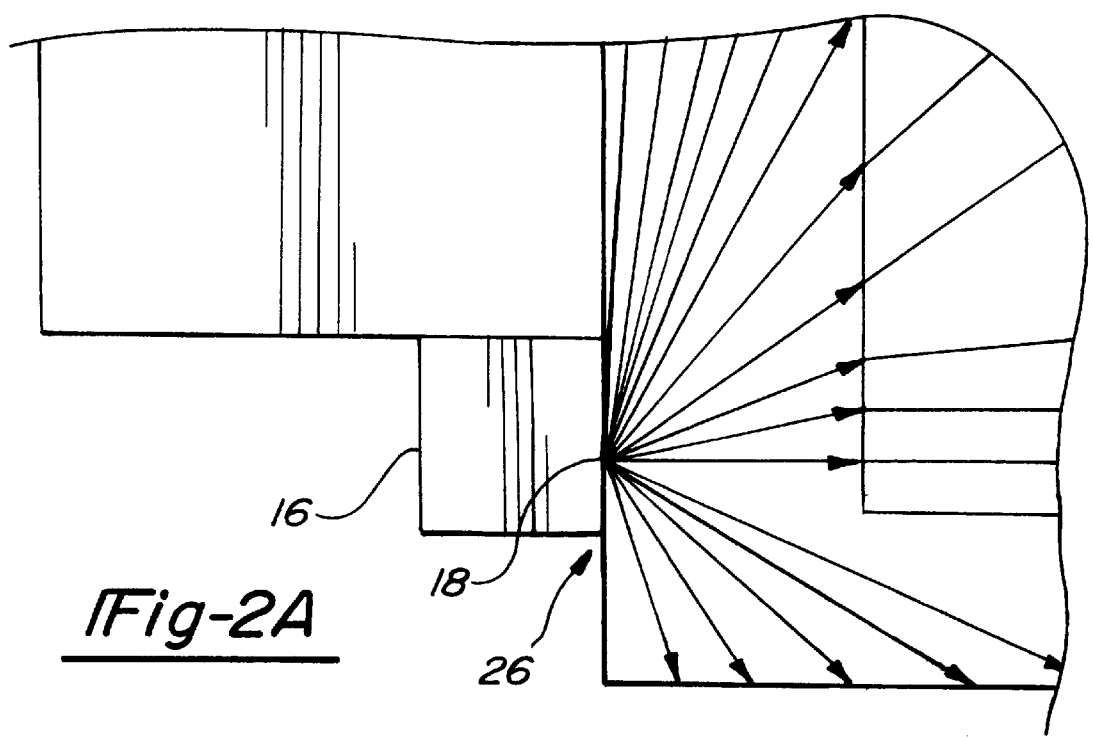
FIG. 2a is an enlarged cross-sectional view of the fuel tank of FIG. 2 showing the optical signals dispersion at the tank wall.

As can be seen in FIG. 2a, the coarseness of the wall 28 at which the optical signal 18 is transmitted acts as a dispersing lens and serves to diffuse and diverge the otherwise well collimated optical signal 18 into a plurality of signals 30 emanating in all directions throughout the vessel 12.

The measuring technique is based on the concept that air with an index of refraction of $\eta a$ and a liquid with an index of refraction of $\eta l$ form a boundary that resembles a pseudo-dielectric waveguide. The collimated optical signal 18 is diffused into a plurality of signals 30 emanating in all directions throughout the vessel. The measuring technique recognized that the optical signals 30 defined as Total Internal Reflection (TIR) 34 at the liquid-air boundary 14 has a maximum intensity of the signals within the vessel. The optical signals 30 are directed parallel to, and move in tandem with, the liquid level. The TIR optical signal 34 is a plurality of optical signals 30 and due to its intensity, is considerably more detectable than any one individual optical signals 30. This TIR optical signal 34 is therefore readily detected by a receiver 20 and compared to expected aspects of the overall optical signals to non-intrusively determine the liquid level within the tank 12.

As shown in FIG. 2, there are a plurality of sensors, or detectors 20. The liquid level is approximately positioned equal to the location of the second detector from the top. Control 15 takes intensity readings from each of the six detectors shown in FIG. 2 and can determine that the intensity was greatest at the second. The control then correlates this reading with an expected level of fluid within the tank.

Detectors 20 are located a desired heights on the tank 12 to detect the TIR signal 34 reflecting parallel from the liquid-air boundary 14 to detect when the liquid level is at a desired height. The accuracy of the present invention is further refined by mounting a plurality of detectors 20 in a vertical array thereby providing a non-intrusive liquid measuring assembly 10 having an incremental digital feedback of the level. The resolution may therefore be varied by increasing the quantity of detectors 20 from one which provides a simple low liquid warning to a tightly packed vertical array which provides highly accurate measurement resolution. For example only, by mounting ten receivers on a fuel tank a related fuel gauge may be provided with a display having demarcations marked in tenths.

The control 15 develops a unique digital signal for each incremental position which is then transmitted by transmitter 17 to receiver 22. Receiver 22 is associated with a control for fuel gauge 24, which moves gauge 24 to a level indication which corresponds to the incremental position identified by transmitter 17.

Figure 3:
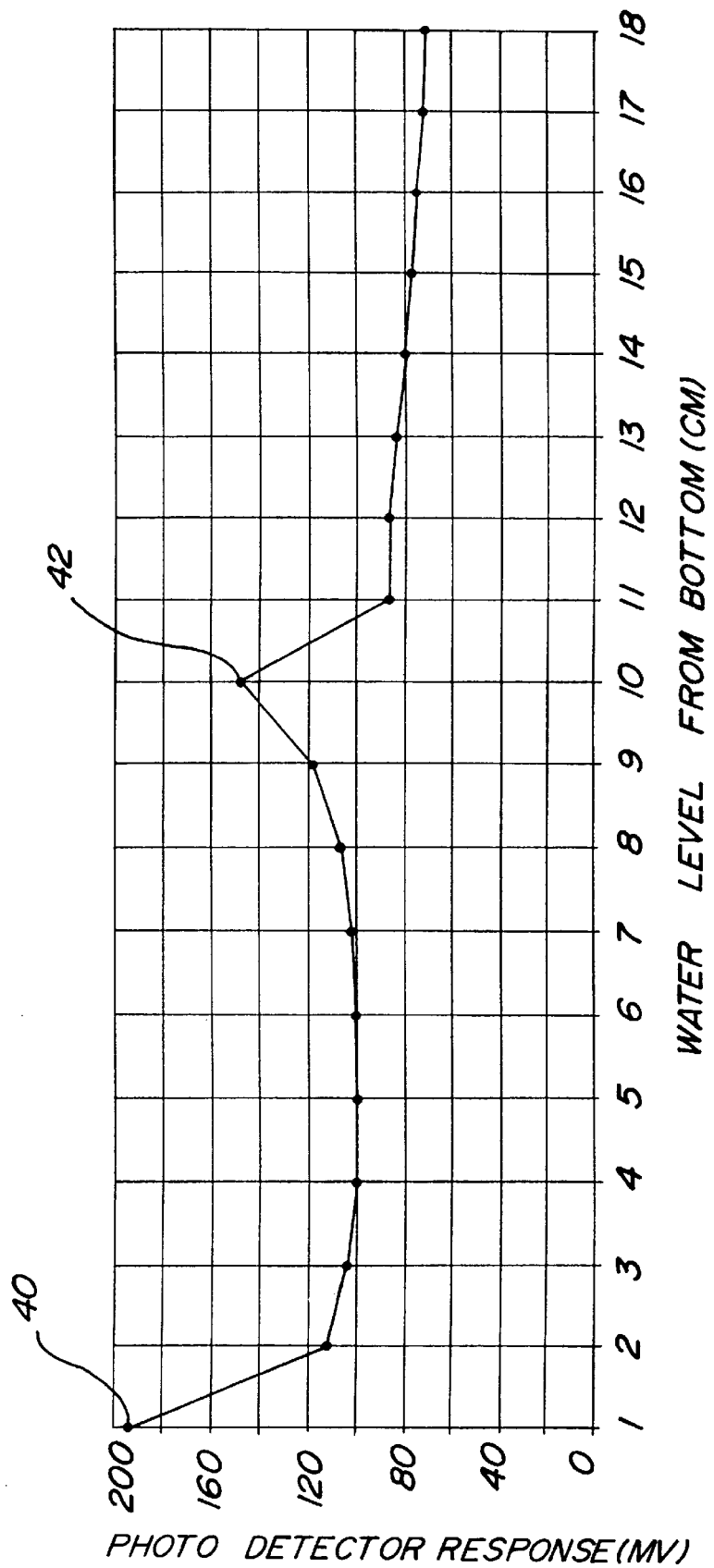
FIG. 3 is an exemplary plot of Water Level vs. Photo-Detector Output displaying the function of the preferred measuring system used in the present invention.

Although the measuring technique is generally known, the basic operation will be disclosed for purposes of a better understanding of the technique. As can be seen in FIG. 3, an exemplary plot of Water Level vs. Photo-Detector Output is presented in order to display the concept. A single photodetector (PD) was affixed to the side of a high density polyethylene vessel 10 cm from the vessel bottom. An optical signal from an HeNe (633 nm) laser was directed against the vessel wall, 1.5 cm from the bottom, and incident to the coarse outer surface of the vessel wall. Water was then poured into the vessel and the PD output voltage measured at each centimeter increase in water level. Two peak responses are immediately evident in the plot. The first peak 40 occurs before the water level rises above the incident laser beam. Due to the dispersion by the high density polyethylene vessel wall 28, a significant amount of optical energy is incident on the PD resulting in the high response. This first peak 40 response will be present from all PDs on the vessel wall, independent of the number of PDs. Consequently, when all the PDs indicate a such peak response, the vessel can be considered empty. The second peak 42 occurs when the water level in the vessel coincides with the height of the PD. In other words, when the second peak 42 occurs, the liquid level and the PD are in the same horizontal plane. This is true due to the maximum intensity discussed above. By monitoring which detector is seeing the maximum intensity, incremented feedback on the liquid level is provided. A control is associated with the detector to compare values and determine the liquid level based upon which sensor is reading the maximum intensity. Additionally, a relationship may be provided between the peak response of two detectors to determine the exact liquid level therebetween.

The PD response is about 20 mv higher when the PD is above the liquid level, than when the PD is below the liquid level. This disparity in optical energy density in the liquid and the air region above the liquid can be used to provide a discriminator where photodetectors can be used to determine the liquid level. Of course, if the liquid level never falls blow the transmitter, only one peak will exist in the plot. It is this relationship of peak PD response or a comparison between the two greatest peak PD responses with respect to the liquid level that the circuit of FIG. 4 is based on.

FIG. 4 is a schematic diagram of a circuit. The photodetector 50 is a photo sensitive transistor in the common emitter configuration. A 20 meg ohm resistor 52 is provided to develop the output voltage as a function of incident optical intensity. The signal is fed to a comparitor 54 for threshold comparison against the second peak 42 of FIG. 3. The output of the comparitor 54 is used to trigger a JK flip-flop 56. The Q output of the JK flip-flop 56 is used to turn on a high intensity LED 58 when the liquid level is in line with the photodetector 50 and an NPN transistor 60 is provided to drive the LED 58. Additionally, in an actual system, a control may compare the signal from any two photodetectors 50 when the liquid level falls therebetween to provide further resolution to the system. Preferably, however, this does provide only digital incremental signals.

The present invention will now be disclosed in simple terms, however, the foregoing description provides a more detailed, and complete description.

In the fuel gauge shown in FIG. 1, there are three incremental points illustrated between empty and full. The incremented points are associated with quarter tank, half tank and three quarter tank. If a vessel were provided with four sensor 20, the control would monitor the light intensity at each of the four sensors. If the uppermost sensor was receiving the greatest intensity, then the control would determine that fuel vessel was full, and move the gauge to the full position. Similarly, in the position illustrated in FIG. 1, the gauge is pointing to the three quarter full. Thus, a lower detector would be sensing the greatest intensity, to result in the position shown in FIG. 1. With this arrangement, there would be an incremental movement of the fuel gauge movement between several positions. The number of positions would correlate to the number of detectors.

This digital incremental level information is easily transmitted between transmitter 17 and detector 22.

The present invention has been described in an illustrative manner, and it is to be understood that the terminology which has been used is intended to be in the nature of words of description rather than of limitation.

As examples only, while a laser is shown as the light source, other types of light sources may be utilized. Further, other electromagnetic radiation sources can be utilized, and other types of signals could also be utilized.

Further, while one measuring technique is disclosed, the invention extends to other techniques. Also, while digital level readings are preferred, the invention may extend to non-digital measuring techniques.

Obviously, many modifications and variations of the present invention are possible in light of the above teachings. It is, therefore, to be understood that within the scope of the appended claims the invention may be practiced otherwise than as specifically described.

What is claimed is:

1. A wireless fuel gauge assembly comprising:
   a fuel tank for containing a liquid having a level defined by a liquid-air boundary, said fuel tank having a plurality of photodetectors spaced apart at respectively different heights within said tank;

a signal transmitter for emitting a detection signal into said tank for reflection from said liquid-air boundary, each of said photodetectors providing a respective output in response to a respective portion of said detection signal reflected from said liquid-air boundary, each output varying in dependence upon whether or not the respective photodetector is above or below said liquid-air boundary;

a control for detecting the outputs of said photodetectors to determine the level of said liquid;

a level transmitter for sending a wireless signal representing the level of said liquid; and a receiver for receiving said wireless signal and providing a corresponding liquid-level signal to a fuel gauge.

2. The assembly of claim 1, wherein said level transmitter sends an RF signal to said receiver.

3. The assembly of claim 1, wherein said signal transmitter emits the detection signal into said tank so that at least one portion of the reflected signal is reflected in a direction parallel to said liquid-air boundary.

4. The assembly of claim 1, wherein said control develops a digital signal representing the level of said liquid as a proportion of a capacity of said fuel tank.

5. The assembly of claim 4, wherein said control develops a series of incremental digital signals.

6. The assembly of claim 1, wherein said technique is an optical technique that monitors light intensity.

7. The assembly of claim 6, wherein said wireless signal is a digital signal.

8. A measuring system for a fuel tank comprising:

a signal transmitter for emitting a detection signal into a fuel tank for reflection from a liquid-air boundary of fuel in said fuel tank, a level of fuel being defined as said liquid-air boundary;

a plurality of photodetectors, each photodetector for detecting a respective portion of said detection signal reflected from said liquid-air boundary and providing a respective output in response thereto, each output varying in dependence upon whether or not the respective photodetector is above or below said liquid-air boundary; and a control for developing from said outputs a digital indication of the level of fuel in said fuel tank.

9. The measuring system of claim 8, wherein said control develops a series of incremental digital level readings representing the level of fuel as a proportion of a capacity of said fuel tank.

10. The measuring system of claim 8, wherein said signal transmitter and said detector are disposed externally of said fuel tank.

11. The measuring system of claim 8, wherein said signal transmitter emits the detection signal into said tank so that at least one portion of the reflected signal is reflected in a direction parallel to said liquid-air boundary.

12. The measuring system of claim 5,
wherein said control monitors liquid level using an optical technique that monitors light intensity.

13. The measuring system of claim 12, wherein the control includes a plurality of sensors each monitoring light intensity.

14. A method of measuring a fuel level in a fuel tank that contains a liquid having a level defined by a liquid-air boundary, the tank having a plurality of photodetectors spaced apart at respectively different heights within the tank; said method comprising the steps of:

(1) emitting a detection signal into the tank for reflection from the liquid-air boundary, each of the photodetectors providing a respective output in response to a respective portion of the detection signal reflected from the liquid-air boundary each output varying in dependence upon whether or not the respective photodetector is above or below the liquid-air boundary;

(2) developing an indication of the level of the liquid by monitoring the outputs of the photodetectors;

(3) wirelessly transmitting the indication to a receiver; and (4) capturing the transmitted indication and communicating the captured indication to a fuel gauge.

15. The method of claim 14, wherein said technique is an optical technique that monitors light intensity.

16. The method of claim 14, wherein said emitting step emits the detection signal into the tank so that at least one portion of the reflected signal is reflected in a direction parallel to the liquid-air boundary.

17. A wireless fuel gauge comprising:

a control for determining a level of fuel in a fuel tank of a vehicle using a technique that monitors outputs from a plurality of photodetectors mounted at different heights within the fuel tank, the outputs being produced in response to receipt of respective portions of a detection signal reflected from a liquid-air boundary of the fuel;

a level transmitter for sending a wireless signal representing the level of said fuel in said fuel tank;

a receiver for receiving said wireless signal and providing a corresponding fuel-signal level; and a fuel gauge for providing to an operator of said vehicle during operation thereof a visual display indicating the level of said fuel in said fuel tank in accordance with said fuel-level signal.

18. The wireless fuel gauge of claim 17, wherein the detection signal is emitted into said tank so that at least one portion of the reflected signal is reflected in a direction parallel to said liquid-air boundary.

19. The wireless fuel gauge of claim 17, further comprising:

a signal transmitter for emitting a detection signal into said fuel tank for reflection from a liquid-air boundary formed by said fuel in said fuel tank; and a detector for detecting a signal reflected from said liquid-air boundary, wherein said control detects a portion of said signal reflected from said liquid-air boundary and develops therefrom a digital indication of the level of fuel in said fuel tank.

20. The wireless fuel gauge of claim 19, wherein said control develops a digital signal representing the level of said fuel as a proportion of a capacity of said fuel tank.

21. The wireless fuel gauge of claim 17, wherein said technique is an optical technique that monitors light intensity.

22. The wireless fuel gauge of claim 21, wherein said wireless signal is a digital signal.

* * * * *